United States Patent [19]

Yoshida et al.

[11] Patent Number: 4,620,159
[45] Date of Patent: Oct. 28, 1986

[54] DEMODULATOR FOR MULTIPHASE PSK OR MULTILEVEL QAM SIGNALS

[75] Inventors: Yasuharu Yoshida; Manabu Yagi, both of Tokyo, Japan

[73] Assignee: NEC Corporation, Tokyo, Japan

[21] Appl. No.: 769,922

[22] Filed: Aug. 27, 1985

[30] Foreign Application Priority Data

Aug. 27, 1984 [JP] Japan .................. 59-177857

[51] Int. Cl.$^4$ .............................................. H03D 3/18
[52] U.S. Cl. ...................................................... 329/50
[58] Field of Search ................ 329/50, 122, 124, 126, 329/135; 375/39, 81, 82, 83, 120; 455/214, 337

[56] References Cited

U.S. PATENT DOCUMENTS

| | | | |
|---|---|---|---|
| 2,972,720 | 2/1961 | Hume | 331/4 |
| 4,205,277 | 5/1980 | Poinas | 331/DIG. 2 X |
| 4,344,040 | 8/1982 | Reilly et al. | 329/50 |
| 4,482,869 | 11/1984 | Hirata | 331/DIG. 2 X |
| 4,528,512 | 7/1985 | Yoshida | 329/124 X |
| 4,546,322 | 9/1985 | Crutcher | 329/50 |

FOREIGN PATENT DOCUMENTS 57-131151 8/1982 Japan .

Primary Examiner—Eugene R. LaRoche
Assistant Examiner—D. C. Mis
Attorney, Agent, or Firm—Sughrue, Mion, Zinn, Macpeak, and Seas

[57] ABSTRACT

In a demodulation circuit, a timing synchronizing circuit generates a timing signal representing a sampling timing of an A/D converter and has a timing signal generator, a polarity identification circuit and a logic circuit. The timing signal generator is phase-controlled by a phase control signal and generates a timing signal. The polarity identification circuit identifies a polarity of a differential coefficient of the baseband signal at a sampling point of the A/D converter and generates a polarity identification signal. Upon logic processing, the logic circuit supplies to the timing signal generator the phase control signal representing a deviation of an actual sampling point of the baseband signal from an optimal sampling point. A carrier asynchronism detection circuit detects an asynchronism state of a carrier regenerating circuit and supplies to the timing synchronizing circuit a signal which changes its loop parameter.

3 Claims, 5 Drawing Figures

PRIOR ART  F I G. 1

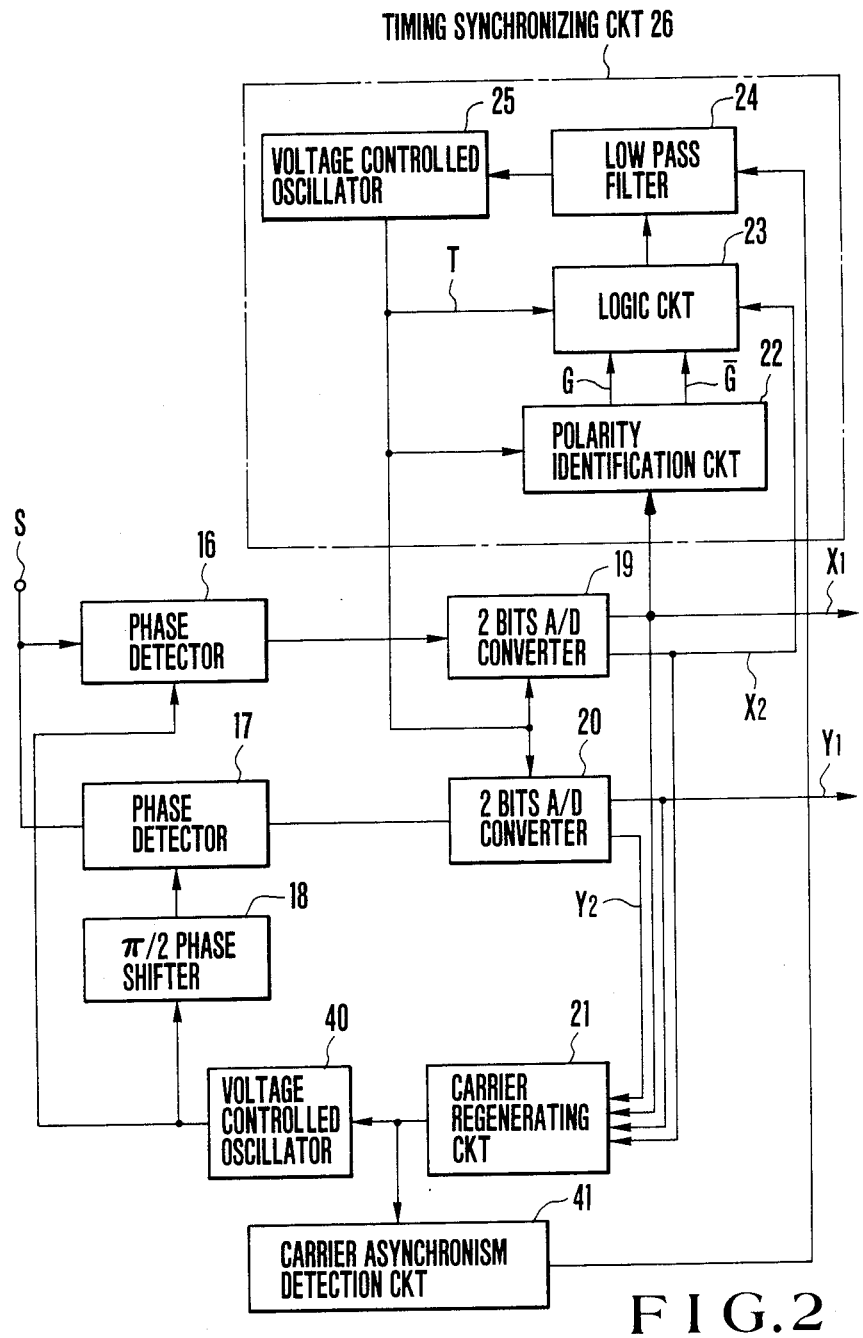
F I G. 2

DEMODULATOR FOR MULTIPHASE PSK OR MULTILEVEL QAM SIGNALS

BACKGROUND OF THE INVENTION

The present invention relates to a demodulation device and, more particularly, to a demodulation device having an improved timing signal generating means for sampling and converting a demodulated baseband signal to a digital signal in a digital carrier transmission system.

In a conventional demodulation device in a digital carrier transmission system, a sampling timing signal having a prescribed period and timing phase is required to sample and convert the demodulated baseband signal to a digital signal. A timing synchronizing circuit is conventionally used to generate the timing signal for extracting a predetermined timing signal from the demodulated baseband signal.

FIG. 1 shows a four-phase modulated signal demodulation device of the related art. Reference symbol S denotes an input terminal of the four-phase modulated signal. The input terminal S is connected to the input terminals of two phase detectors 1 and 2. The control terminals of the phase detectors 1 and 2 are connected to an output of a voltage-controlled oscillator 40 directly and through a $\pi/2$ phase shifter 3, respectively. The output terminals of the phase detectors 1 and 2 are connected to the input terminals of 2-bit A/D converters 4 and 5 and full-wave rectifiers 7 and 8, respectively. The output terminals of the full-wave rectifiers 7 and 8 are connected to the input terminals of timing synchronizing circuits 14 and 15. Two output signals from the 2-bit A/D converters 4 and 5 are supplied to a carrier regenerating circuit 6. The output of the carrier regenerating circuit 6 is supplied to the voltage-controlled oscillator 40.

The timing synchronizing circuit 14 has the same arrangement as the timing synchronizing circuit 15. The timing synchronizing circuit 14 comprises a voltage-controlled oscillator 13, a phase comparator 11 for comparing a phase of the output of the full-wave rectifier 7 with that of the voltage-controlled oscillator 13, and a low-pass filter 12 for receiving the output of the phase comparator 11 to control the output of the voltage-controlled oscillator 13. The output of the voltage-controlled oscillator 13 is supplied to a phase adjusting circuit 9. The output terminal of the phase adjusting circuit 9 is connected to the control terminal of the 2-bit A/D converter 4.

The full-wave rectifier 8, the 2-bit A/D converter 5, a phase adjusting circuit 10 and the timing synchronizing circuit 15 are connected in the same manner as described above.

A 4-phase PSK (phase shift keying) carrier wave is supplied to the input terminal S and is branched and supplied to the phase detectors 1 and 2. Upon reception of a control signal (i.e., an error signal) from the carrier regenerating circuit 6, the voltage-controlled oscillator 40 generates a carrier regenerating signal having a predetermined phase. This carrier regenerating signal is supplied to the phase detector 1 directly and to the phase detector 2 through the $\pi/2$ phase shifter 3, as respective reference signals which have a phase difference of $\pi/2$ radian to each other. The phase detectors 1 and 2 detect the branched 4-phase PSK carrier wave in accordance with the reference signals and supply binary baseband signals to the 2-bit A/D converters 4 and 5, respectively. The binary baseband signals are also supplied to the full-wave rectifiers 7 and 8, respectively. The full-wave rectifiers 7 and 8 double the frequency of the binary baseband signals to extract timing signals, respectively. These extracted timing signals are supplied to the timing synchronizing circuits 14 and 15, respectively. The operation of the timing synchronizing circuit 14 is the same as that of the timing synchronizing circuit 15, so that the operation is exemplified only by the timing synchronizing circuit 14.

The extracted timing signal from the full-wave rectifier 7 is supplied to the phase comparator 11 in the timing synchronizing circuit 14. The phase comparator 11, the low-pass filter 12 and the voltage-controlled oscillator 13 constitute a phase synchronizing loop. The voltage-controlled oscillator 13 generates a regenerated timing signal which is synchronized with the phase of the extracted timing signal. The jitter component of the regenerated timing signal is suppressed by an equivalent narrow-band filter characteristic. The regenerated timing signal is supplied to the phase adjusting circuit 9 whose output is then supplied to the control terminal of the 2-bit A/D converter 4. Similarly, the timing synchronizing circuit 15 regenerates a timing signal. The jitter component of this regenerated signal is also suppressed in accordance with the extracted timing signal supplied from the full-wave rectifier 8 in the same manner as described above. The regenerated signal is adjusted by the phase adjusting circuit 10. The phase-adjusted timing signal is thus supplied from the phase adjusting circuit 10 to the control terminal of the 2-bit A/D converter 5.

In the 2-bit A/D converters 4 and 5, the binary baseband signals supplied from the phase detectors 1 and 2 are sampled in response to the regenerated timing signals supplied through the phase adjusting circuits 9 and 10, respectively. The A/D converters 4 and 5 then generate data signals X1 and Y1, respectively. Data signals X2 and Y2 in addition to the data signals X1 and Y1 are generated by the 2-bit A/D converters 4 and 5, respectively. The data signals X1, X2, Y1 and Y2 are supplied to the carrier regenerating circuit 6. An error signal is generated by the carrier regenerating circuit 6 to control the voltage-controlled oscillator 40, so that a predetermined carrier regenerating signal is generated. This signal is branched and supplied to the phase detectors 1 and 2 directly and through the $\pi/2$ phase shifter 3, respectively. The operation of the carrier wave regenerating circuit 6 is well known to those skilled in the art, as described in Japanese Patent Published No. 57-131151.

In the conventional demodulation device described above, the output signals of the timing synchronizing circuits 14 and 15 must be adjusted by means of the phase adjusting circuits 9 and 10 so that the demodulated baseband signal is sampled by the 2-bit A/D converters 4 and 5 at optimal timings, resulting in inconvenience.

SUMMARY OF THE INVENTION

It is, therefore, a principal object of the present invention to provide a demodulation device having a timing synchronizing circuit which eliminates the conventional drawback, which always samples a demodulated baseband signal at optimal timings without performing phase adjustment of a timing signal, and which has a wide phase-lock range.

In order to achieve the above object of the present invention, there is provided a demodulation device comprising: phase detector means for receiving a digital carrier modulated signal having a bandwidth limited in a given manner and generating a predetermined demodulated baseband signal; A/D converter means for receiving an output signal from the phase detector means and sampling the output signal in response to a predetermined timing signal to obtain a digital signal; means responsive to the output signal from the A/D converter means for supplying a carrier wave to the phase detector means; timing synchronizing means for generating a timing signal representing a timing of sampling of the A/D converter means, the timing synchronizing means having a timing signal generator a phase of which is controlled by a predetermined phase control signal and which generates the timing signal, a polarity identification circuit for receiving a first predetermined signal among output signals from the A/D converter means, identifying a polarity of a differential coefficient of the baseband signal at a sampling point of the A/D converter means, and generating a polarity identification signal, and logic circuit means for receiving and processing according to a predetermined logic the polarity identification signal from the polarity identification circuit and a second predetermined signal among the output signals from the A/D converter means and generating and supplying to the timing signal generator the phase control signal representing a deviation of an actual sampling point of the baseband signal from an optimal sampling point; and carrier asynchronism detecting means for detecting an asynchronism state of the carrier regenerating means and supplying to the timing synchronizing means a signal which controls a loop parameter of the timing synchronizing means.

BRIEF DESCRIPTION OF THE DRAWINGS

FIG. 2 is a block diagram of a demodulation device according to an embodiment of the present invention;

DETAILED DESCRIPTION OF THE PREFERRED EMBODIMENTS

Figure 1:
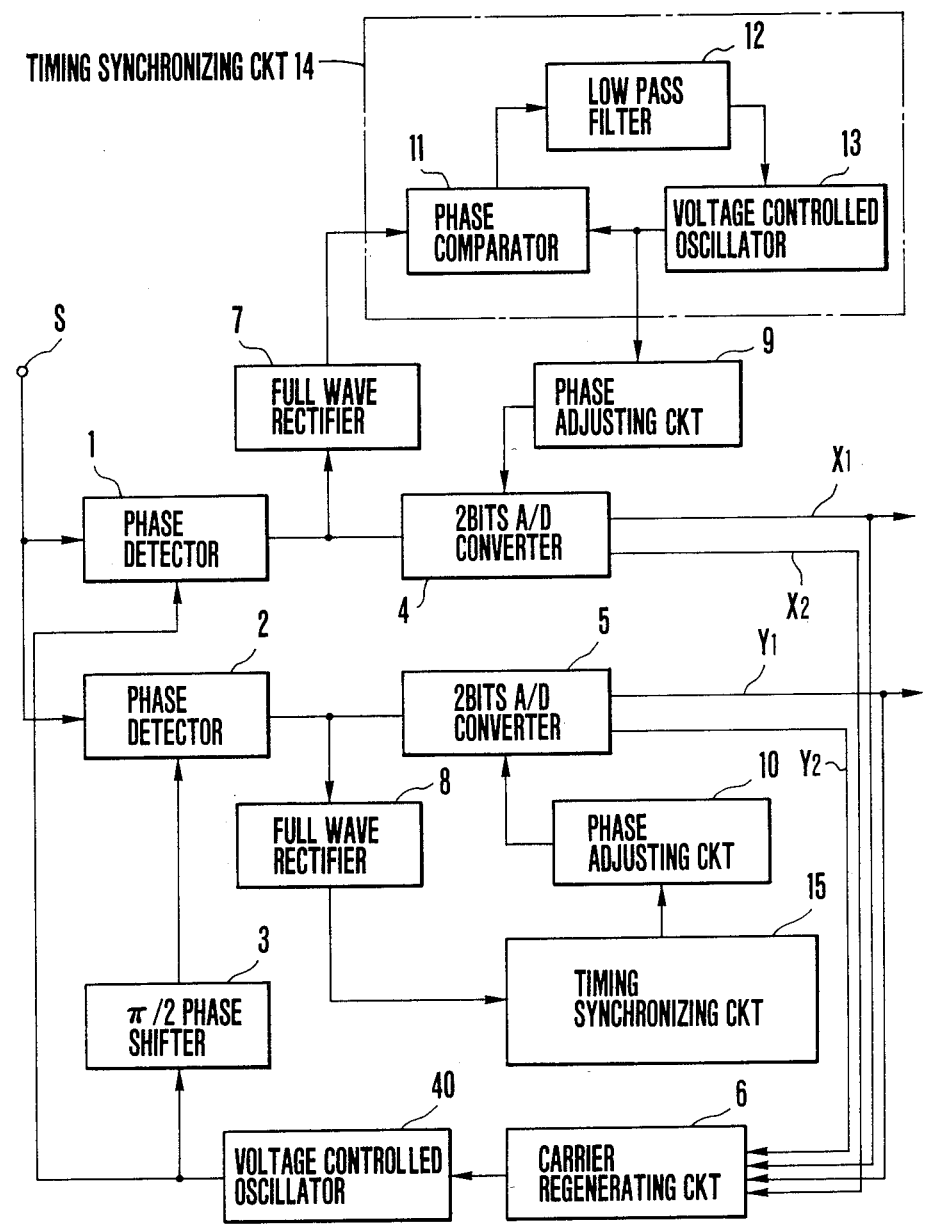
FIG. 1 is a block diagram of a 4-phase modulated signal demodulation device of the related art.

FIG. 2 is a block diagram showing a 4-phase modulated signal demodulation device according to an embodiment of the present invention. Referring to FIG. 2, an input terminal S for a 4-phase modulated signal is connected to the input terminals of phase detectors 16 and 17. The output terminals of the phase detectors 16 and 17 are connected to the input terminals of 2-bit A/D converters 19 and 20, respectively. The 2-bit A/D converters 19 and 20 have output terminals for generating output signals X1 and X2 and Y1 and Y2, respectively. These output terminals are connected to the input terminals of a carrier regenerating circuit 21. The output terminal of the carrier regenerating circuit 21 is connected to the input terminal of a voltage-controlled oscillator 40 and that of a carrier asynchronism detection circuit 41. The output terminal of the voltage-controlled oscillator 40 is directly connected to the control terminal of the phase detector 16. The output terminal of the voltage-controlled oscillator 40 is also connected to the control terminal of the phase detector 17 through a $\pi/2$ phase shifter 18.

The control terminals of the 2-bit A/D converters 19 and 20 are connected to an output terminal of a timing synchronizing circuit 26. The timing synchronizing circuit 26 comprises a polarity identification circuit 22, a logic circuit 23, a low-pass filter 24 and a voltage-controlled oscillator 25. An output of the low-pass filter 24 is supplied to the voltage-controlled oscillator 25, so that the voltage-controlled oscillator 25 generates a timing signal The low-pass filter 24 also serves as a means for changing a loop parameter of the timing synchronizing circuit 26. The output signal (i.e., the timing signal) from the voltage-controlled oscillator 25 and the output signal X1 from the 2-bit A/D converter 19 are supplied to the polarity identification circuit 22. The polarity identification circuit 22 generates output signals G and $\overline{G}$ (to be described in detail later) in accordance with the signal X1. The signals G and $\overline{G}$ are supplied together with the output signal from the voltage-controlled oscillator 25 and the output signal X2 from the 2-bit A/D converter 19 to the logic circuit 23. In response to these signals, the logic circuit 23 performs logic processing (to be described later) and generates the phase control signal which is then supplied to the input terminal of the low-pass filter 24. The control terminal of the low-pass filter 24 is connected to the output terminal of the carrier asynchronism detection circuit 41.

Figures 3A, 3B:
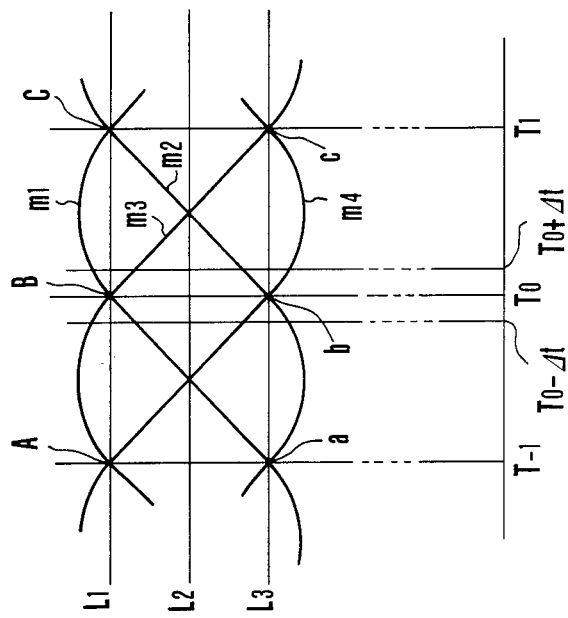
FIGS. 3(a) and 3(b) are respectively timing charts for explaining the operation of the device of FIG. 2.

The operation of the demodulation device of FIG. 2 will be described hereinafter. Referring to FIG. 2, the baseband signal which has a limited bandwidth and which is generated by the phase detector 16 is supplied to the 2-bit A/D converter 19 and is sampled by a timing signal supplied from the voltage-controlled oscillator 25. The 2-bit A/D converter 19 thus generates the data signals X1 and X2. FIG. 3(a) shows waveforms m1, m2, m3 and m4 of the binary baseband signal having the limited bandwidth and supplied to the 2-bit A/D converter 19. The binary baseband signals m1, m2, m3 and m4 are sampled by the 2-bit A/D converter 19, identified by reference levels L1, L2 and L3 shown in FIG. 3 and converted to the data signals X1 and X2. The relationship between the baseband signal mi (i = 1 to 4) and the data signals X1 and X2 is shown in Table 1 below.

TABLE 1

| Baseband Signal mi (i = 1 to 4) | X1 | X2 |
|---|---|---|
| mi > L1 | 1 | 1 |
| L2 < mi < L1 | 1 | 0 |
| L3 < mi < L2 | 0 | 1 |
| mi < L3 | 0 | 0 |

T−1, T0 and T1 in FIG. 3(b) represent optimal sampling points during three timing slots of the signals of FIG. 3(a). When the waveforms m1 to m4 are sampled during the time slot between the sampling points T−1 to T1, the levels of the baseband signal are given as A, a, B, b, C and c. The data signal X2 is set at logic "1" or "0" at a 50% probability. However, when the waveforms m1 to m4 are sampled at time T0+Δt or T0−Δt, the data signals X2 are given in Table 2 below.

TABLE 2

| Data Signal Sampling Point | Data Signal X2 Waveform | | | |
|---|---|---|---|---|
| | m1 | m2 | m3 | m4 |
| T0 + Δt | 1 | 1 | 0 | 0 |
| T0 − Δt | 0 | 0 | 1 | 1 |

In case of the baseband signal waveforms m1 and m2, that is, when the polarity of the differential coefficients at time T0 is positive, the data signal X2 is always set at logic "1" when the sampling point is set at time T0+Δt. However, when the sampling point is set at time T0−Δt, the data signal X2 is always set at logic "0". However, in case of the waveforms m3 and m4, that is, when the polarity of the differential coefficients at time T0 is negative, the data signal X2 is set at logic "0" at time T0+Δt and logic "1" at time T0−Δt. By inverting the polarity of the data signal X2 according to the waveforms m1 and m2, the data signal X2 for the waveforms m3 and m4 can be obtained. Therefore, after identifying the polarity of the differential coefficients of the baseband signal at time T0, the baseband signal is processed in a predetermined manner by reference to the identified polarity, thereby obtaining the error signal for detecting the shift of the actual sampling point from the optimal one. The baseband signal waveforms mi are identified by the predetermined reference levels L1, L2 and L3 on the basis of the above principle, and the baseband signal can be converted to the data signals X1 and X2.

The data signal X1 is supplied to other circuit as an ordinary data signal and is supplied to the polarity identification circuit 22 in the timing synchronizing circuit 26. The polarity identification circuit 22 identifies the waveforms m1 to m4 of the band-limited baseband signal in accordance with the input signal X1. When the waveform identified by the polarity identification signal 22 represents the waveform m1 or m2, the signal G therefrom is set at logic "1". However, when the identified signal represents the waveform m3 or m4, the signal $\overline{G}$ is set at logic "1".

The logic circuit 23 comprises a circuit for inverting the polarity of the data signal X2 supplied from the 2-bit A/D converter 19 when the signal $\overline{G}$ is set at logic "1", i.e., when the identified signal represents the waveform m3 or m4 of the baseband signal. When the signals G and $\overline{G}$ are set at logic "0", i.e., when no identification is performed, this inverting circuit holds the data signal X2 corresponding to the latest waveform. Therefore, the logic circuit 23 generates the predetermined error signal for detecting a sampling timing error in the 2-bit A/D converter 19. The error signal as the phase control signal of the timing signal generator consisting of the voltage-controlled oscillator 25 and the low-pass filter 24 is supplied to the low-pass filter 24. The phase of the predetermined timing signal T generated by the voltage-controlled oscillator 25 is automatically controlled. The timing synchronizing circuit 26 supplies the predetermined timing signal T to the 2-bit A/D converters 19 and 20 at the optimal timings.

The timing synchronizing circuit 26 obtains the error signal from the demodulated signal with an eye pattern which represents opened eye as shown in FIGS. 3(a) and 3(b). In a carrier asynchronous state the eye pattern does not represent the full opened eye, so that a loop gain is greatly decreased without a correction. Accordingly, in the demodulation device shown in FIG. 2 wherein the carrier regenerating circuit 21 is stably operated after the timing synchronizing circuit 26 is stably operated, it is very difficult to obtain a wide phase-lock range as compared with the conventional timing synchronizing circuit.

According to the above embodiment, the carrier asynchronism detection circuit 41 is arranged to correct a loop gain. The carrier asynchronism detection circuit 41 detects a carrier asynchronous state and may comprise a circuit utilizing a difference in impedance of synchronized and asynchronised outputs from the carrier regenerating circuit 21 (see U.S. Pat. No. 2,972,720, issued on 1961, Feb. 21; assigned to Westing House Electric Corporation), or a circuit for detecting a beat signal generated during asynchronous operation. An output from the carrier asynchronism detection circuit 41 is supplied as the control signal to the low-pass filter 24 to switch its parameter between the carrier asynchronising and synchronizing modes, thereby correcting the change in a loop band which is caused by the change in loop gain and hence obtaining the wide phase-lock range.

Figure 4:
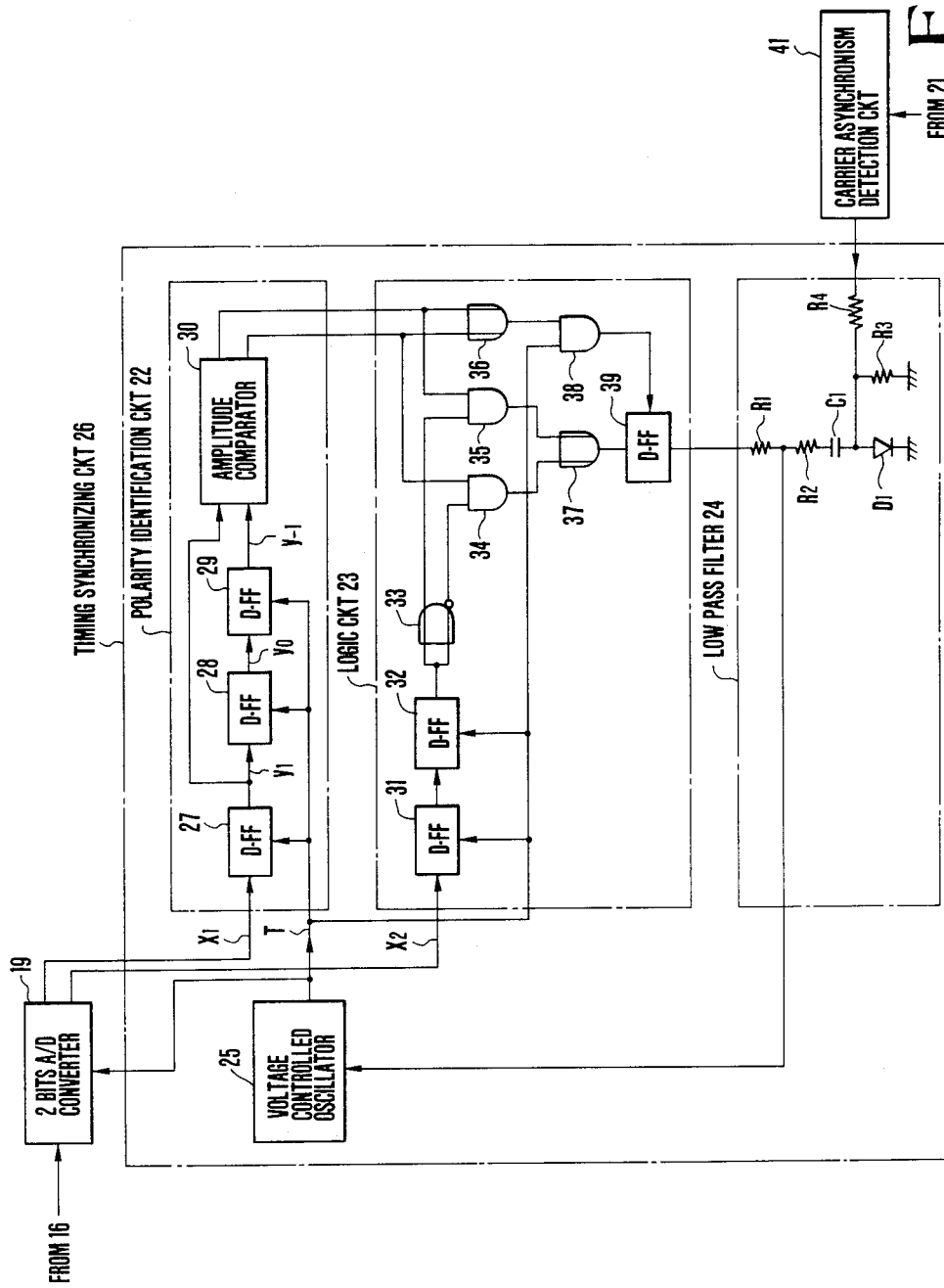
FIG. 4 is a detailed diagram showing a timing synchronizing circuit in the device of FIG. 2.

FIG. 4 shows a detailed arrangement of the timing synchronizing circuit 26. Referring to FIG. 4, the polarity identification circuit 22 comprises D flip-flops (D-FF) 27, 28 and 29 and an amplitude comparator 30. The input terminal of the D flip-flop 27 is connected to the X1 signal output terminal of the 2-bit A/D converter 19. The output terminal of the D flip-flop 27 is connected to the input terminal of the D flip-flop 28 and to one input terminal of the amplitude comparator 30. The output terminal of the D flip-flop 28 is connected to the input terminal of the D flip-flop 29. The output terminal of the D flip-flop 29 is connected to the other input terminal of the amplitude comparator 30. The amplitude comparator 30 has two output terminals for supplying the polarity identification signals G and $\overline{G}$ to the logic circuit 23. The respective control terminals of the flip-flops 27, 28 and 29 are connected to the output terminal of the voltage-controlled oscillator 25. With the above arrangement, in the polarity identification circuit 22, the D flip-flops 27, 28 and 29 serve as a 3-bit memory for sequentially storing the data signal X1 in response to the timing singal T from the voltage-controlled oscillator 25. Outputs y1 and y−1 from the D flip-flops 27 and 29 are supplied to the amplitude comparator 30. The amplitude comparator 30 has a function for identifying the polarity of the differential coefficients of the baseband signal at the sampling point T0 in the 2-bit A/D converter 19. The respective data y−1 and y1 at the sampling points T−1 and T1 are subjected to comparison to identify the polarity of the differential coefficients. Assume that the polarity of the differential coefficients is negative when the outputs y−1 and y1 are set at logic "0" and logic "1", respectively. The amplitude comparator 30 generates the signals G and $\overline{G}$ to identify the polarity. In this case, the signal G is set at logic "1" when the baseband signal waveform is m1 or m2. The signal $\overline{G}$ is set at logic "1" when the baseband signal waveform is m3 or m4.

Referring to FIG. 4, the logic circuit 23 comprises D flip-flops 31, 32 and 39, an OR/NOR gate 33, AND gates 34, 35 and 38, and OR gates 36 and 37. The input terminal of the D flip-flop 31 is connected to the X2 output terminal of the 2-bit A/D converter 19. The output terminal of the D flip-flop 31 is connected to the input terminal of the D flip-flop 32. The output terminal of the D flip-flop 32 is connected to the two input terminals of the OR/NOR gate 33. The OR output terminal of the OR/NOR gate 33 is connected to one input terminal of the AND gate 35. The NOR output terminal of the OR/NOR gate 33 is connected to one input terminal of the AND gate 34. The other input terminal of each of the AND gates 34 and 35 is connected to a corresponding one of the two output terminals of the amplitude comparator 30. The output terminals of the AND gates 34 and 35 are connected to the two input terminals of the OR gate 37, respectively. The output terminal of the OR gate 37 is connected to one input terminal of the D flip-flop 39.

The two output terminals of the amplitude comparator 30 in the polarity identification circuit 22 are connected to the two input terminals of the OR gate 36, respectively. The output terminal of the OR gate 36 is connected to one input terminal of the AND gate 38. The other input terminal of the AND gate 38 is connected to the control terminals of the D flip-flops 31 and 32 and the output terminal of the voltage-controlled oscillator 25. The output terminal of the AND gate 38 is connected to the other input terminal of the D flip-flop 39.

With this arrangement, in the logic circuit 23, the data signal X2 is supplied to the OR/NOR gate 33 through the D flip-flops 31 and 32. An output signal from the OR/NOR gate 33 is supplied to the AND gates 34 and 35. A gate circuit consisting of the AND gates 34 and 35 and the OR gate 37 passes the data signal X2 without modification when the signal G is set at logic "1". However, when the signal $\overline{G}$ is set at logic "1", the polarity of the data signal X2 is inverted, and the inverted signal is outputted from this gate circuit. The AND gate 38 generates the timing signal T when the signal G or $\overline{G}$ is set at logic "1". When both the signals G and $\overline{G}$ are set at logic "0", the AND gate 38 generates a signal of logic "0". The output from the OR gate 37 appears at the D flip-flop 39 without modification when the waveforms of the baseband signal are represented by m1 to m4. Otherwise, the D flip-flop 39 holds the data signal X2 corresponding to the latest one of the waveforms m1 to m4.

The low-pass filter 24 will be described hereinafter. Referring to FIG. 4, the low-pass filter 24 comprises a secondary lag/lead filter consisting of a series circuit of resistors R1 and R2 and a capacitor C1, and a parallel circuit of a diode D1 and a resistor R3 which is connected to the capacitor C1. Resistances of the resistors R1, R2 and R3 are represented by the same reference symbols (i.e., R1, R2 and R3), and ON and OFF resistances of the diode D1 are given as RS and RR, respectively. The resistance of the resistor R1 is sufficiently larger than those of the resistors R2 and R3. The resistance of the resistor R3 is sufficiently larger than the ON resistance RS of the diode D1 and is sufficiently smaller than the OFF resistance RR thereof.

A joint between the resistors R1 and R2 is connected to the control terminal of the voltage-controlled oscillator 25. A joint between the capacitor C1 and the diode D1 and a joint of the capacitor C1 and the resistor R3 are connected to the output terminal of the carrier asynchronism detection circuit 41 through a resistor R4. A phase-lock range ($\omega p$) of the secondary loop of the low-pass filter 24 having the arrangement described above is represented by the following equation:

$$\omega p \propto M = K0 \cdot Kd \sqrt{\tau 2/\tau 1}$$

for $\tau 1 \approx R1 \cdot C1, R1 >> R2\text{off}$ $\tau 2 = R2\text{on} \cdot C1$ or $R2\text{off} \cdot C1$ $R2\text{on} \approx RS + R2, R3 >> RS$ $R2\text{off} \approx R3 + R2, R3 << RR$ where $K0 \cdot Kd$ is the loop gain.

The phase-lock range $\omega p$ changes in accordance with the ON/OFF operation of the diode D1. The ON/OFF operation of the diode D1 is controlled in accordance with the output from the carrier asynchronism detection circuit 41. When a ratio $R2\text{on}/R2\text{off}$ is selected to keep M substantially constant irrespective of the change in loop gain $K0 \cdot Kd$, a sufficiently wide phase-lock range during carrier asynchronization is possible. During carrier synchronization, an optimal loop band can be obtained.

A technique can be proposed to eliminate the change in loop gain $K0 \cdot Kd$. The same effect as described above can be obtained even if a gain of a DC amplifier arranged within the loop is controlled.

In the above description, the loop bands are kept substantially identical during carrier asynchronization and synchronization. However, a necessary phase-lock range can be obtained without using such a technique. In practice, a proper resistance R2off can be set to obtain a proper loop parameter, thereby obtaining the necessary phase-lock range.

The above embodiment is exemplified by the 4-phase modulated signal demodulation device. However, the present invention is not limited to this, but can be extended to a multi-phase (4 phases or more) modulation system or multi-level orthogonal amplitude modulation system (QAM). For example, when the present invention is applied to a 64-value orthogonal amplitude modulation system, the 2-bit A/D converters 19 and 20 are replaced with 4-bit A/D converters, respectively.

The present invention can be applied to a demodulation device for an N-phase modulation system (N=2, 4, 8, 16, ...) or an $L^2$-value orthogonal amplitude modulation system (L=2, 3, 4, ...).

As described above in detail, in the demodulation device for the multi-phase modulation system or multi-value orthogonal amplitude modulation system, to generate a sampling signal by referring to the specific data signal included in the data signals generated from the predetermined A/D converter, the timing synchronizing circuit is used as a timing signal generating means for causing the A/D converter to perform sampling. The phase adjustment of the timing signal to be supplied to the A/D converter is eliminated. The modulated baseband signal can always be sampled at the optimal timings, and at the same time, a sufficiently wide phase-lock range can be obtained.

What is claimed is:

1. A demodulation device comprising:
   phase detector means for demodulating a multiphase PSK carrier wave or a multilevel QAM wave into a baseband signal;

A/D converter means for sampling the output signal of said phase detector means in response to a timing signal and converting it to digital signals;

means responsive to said digital signals from said A/D converter means for supplying a carrier wave to said phase detector means;

timing synchronizing means for generating a timing signal representing a timing of sampling of said A/D converter means, and timing synchronizing means having a timing signal generator, a phase of which is controlled by a predetermined phase control signal, which generates the timing signal, and which includes a low-pass filter and a voltage controlled oscillator adapted to receive the output from said filter and to provide an output in at least a loop with a loop parameter, a polarity identification circuit for receiving a first predetermined signal among said digital signals from said A/D converter means, identifying a polarity of a differential coefficient of the baseband signal at a sampling point of said A/D converter means and generating a polarity identification signal, and logic circuit means for receiving and processing according to a predetermined logic the polarity identification signal from said polarity identification circuit and a second predetermined signal among said digital signals from said A/D converter means and generating and supplying to said timing signal generator a phase control signal representing a deviation of an actual sampling point of the baseband signal from an optimal sampling point; and carrier asynchronism detecting means for detecting an asynchronism state of said carrier wave supplying means and supplying to said timing synchronizing means a signal which controls said loop parameter of said timing synchronizing means.

2. A device according to claim 1, wherein the output signal from said carrier asynchronism detection means is supplied to said low-pass filter in said timing signal generator to switch bandwidth parameters of said low-pass filter between carrier asynchronising and synchronizing modes.

3. A device according to claim 1, wherein said low-pass filter comprises a secondary delay/lead filter consisting of a series circuit of first and second resistors and a capacitor and a parallel circuit of a diode and a third resistor which is connected between one end of said capacitor and a reference potential terminal, one end of said first resistor being connected to an output terminal of said logic circuit means, a joint between said first and second resistors being connected to an input terminal of said voltage-controlled oscillator in said timing signal generator, a joint between said capacitor and one end of said parallel circuit being connected to an output terminal of said carrier asynchronism detection means, and the other end of said parallel circuit being connected to said reference potential terminal.

* * * * *